INVENTOR.
JOHN J. FERRER,
BY
Walter J. Odam
ATTORNEY.

FIG. 2.

Dec. 2, 1969   J. J. FERRER   3,481,667
DISPLAY CONTROL SYSTEM
Filed March 27, 1967   6 Sheets-Sheet 3

FIG. 3.

Dec. 2, 1969  J. J. FERRER  3,481,667

DISPLAY CONTROL SYSTEM

Filed March 27, 1967  6 Sheets-Sheet 5

United States Patent Office 3,481,667
Patented Dec. 2, 1969

3,481,667
DISPLAY CONTROL SYSTEM
John J. Ferrer, Los Angeles, Calif., assignor to Hughes Aircraft Company, Culver City, Calif., a corporation of Delaware
Filed Mar. 27, 1967, Ser. No. 626,326
Int. Cl. G03b *21/00, 21/26*
U.S. Cl. 353—11                               11 Claims

ABSTRACT OF THE DISCLOSURE

A display device for providing on a chart presentation, a route segment indicator line representing a desired route and a vernier deviation indicator line representing a magnified indication of the error between the desired route and a present position. The position of the vernier deviation line may be any selected function of the route error. First and second internal cam surfaces are provided to be jointly rotatable relative to a lens structure and to control the positions of respective first and second reticles to form the route segment indicator and vernier deviation indicator lines. A differential gear is provided to selectively control rotation of the cams or rotation of both of the cams and the lens structure so that the lines move across the display and rotate proportional to control input signals.

BACKGROUND OF THE INVENTION

The invention relates to flight navigation systems and particularly to a display device for presentation on a surface, which may include a chart presentation, a visual representation of a segment of a desired or commanded course as well as a continuous and improved visual display of positional error with respect to a commanded course during flight operation.

Flight navigation techniques generally employed today utilize a system that is coupled with ground controlled vectoring of in-flight aircraft to permit maximum efficiency of aircraft operation between origin and destination points. These conventional flight control systems do not provide an optimum indication of flight path, desired path and flight path error. An alternative proposal would be advantageous that provides improved display equipment to increase the flight crew capabilities of controlled location during flight with a consequent reduction in the spatial requirements between aircraft occupying substantially continuous airspace.

SUMMARY OF THE INVENTION

Briefly, the display control system of the invention includes a first structure rotatable on a fixed mounting. An elongated slot is provided at a flanged end of the first structure and includes first and second reticle holders slideable along the slot. Rotatably positioned on the first structure is a cam structure having first and second cams contacting pins on the first and second reticle holders to control the respective positions thereof. The first and second reticle holders contain reticle plates for respectively forming a route segment indicator line having a gap therein and a vernier deviation indicator line substantially equal to the length of the gap. The second cam has a surface shaped to provide a desired function of the surface of the first cam such as providing a movement of the vernier deviation line from the center of the display at a rate that is a selected multiple of the rate of movement of the route segment indicator line from the center of the display. A differential gear structure controls the rotation of the first and second cams on the first structure and the rotation of the first structure including the cams, on the fixed mounting. The cam surfaces have a crossover point so that the symbols are movable on either side of the center of the display.

It is therefore an object of this invention to provide an improved display system.

It is a further object of this invention to provide a system for forming improved navigation route display symbols.

It is a still further object of this invention to provide an improved symbol control structure.

It is another object of this invention to provide a symbol generator structure for moving two reticles in the same object plane of an optical system to provide cursor lines on a display that move across the screen and rotate proportional to control input signals.

It is still another object of this invention to provide a symbol generator to display first and second lines movable radially from a center point with a desired relative rate of movement.

BRIEF DESCRIPTION OF DRAWINGS

The novel features of the invention, as well as the invention itself, both as to its organization and method of operation, will best be understood from the accompanying description, taken in connection with the accompanying drawings, in which like reference characters refer to like parts, and in which.

DESCRIPTION OF THE PREFERRED EMBODIMENT

The symbol generator of the present invention relates to the provision of a visible display such as may be provided on a navigation control display surface. The visible display includes a background map of a navigational chart having superimposed thereon a display route segment of a great circle course between a start point and destination point. The segment of the displayed great circle course comprises a line herein sometimes referred to as a course line or route segment indicator (RSI). In one arrangement in accordance with the invention, the route segment indicator line is segmented, that is, a central portion of the visibly displayed line is independently position controllable on the display screen. This independently controllable segment of the direct course line from start point to destination is herein sometimes referred to as a vernier deviation indicator (VDI).

Figure 1:
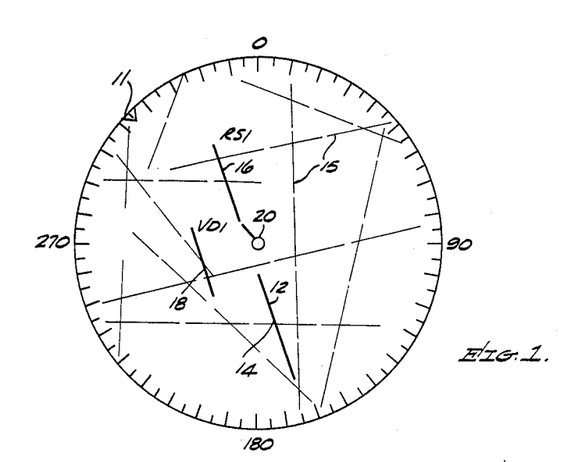
FIG. 1 is a plan view of a presentation, display screen or display surface in accordance with the invention.

Referring now to FIG. 1, numeral 10 indicates a visual display screen surface or panel of generally circular form that may be utilized with the symbol forming mechanism and system of the invention, and defining at its outer periphery a compass rose segmented into 360° with true north being directed upwardly, in the illustrated arrangement. A map or chart is displayed on the screen 10 as indicated by the lines 15.

Upon computation of a start point and direction, a route segment indicator (RSI) or a portion of a direct great circle course between start point and destination is projected on the display 10 and illustrated by the line 12. It is noted that the line 12 is segmented as shown by lines 14 and 16 and that the line has a lapse in continuity as a hiatus or gap exists in the central portion thereof. A vernier deviation indicator (VDI) segment of the route segment indicator 12 is shown as a line 18 in spaced relation to the hiatus in the route segment indicator 12. Such an indication, during flight, would indicate that the craft's present position is off the commanded course to the right requiring a left heading adjustment to bring the craft back onto the commanded course. Once the heading adjustment is made, the vernier deviation indicator segment 18, as a result of changes of the position of the craft and of continuous information input from the computer, would gradually move in the visible display to the right as shown in FIG. 1 until the craft reached the commanded course whereupon the ends of the segment 18 would be contiguous with the segments 14 and 16 of the RSI 12. This condition indicates to the crew that the craft is properly on the commanded course. At the same time, an aircraft present position symbol is positioned at the continuous lines 14, 18 and 16.

In accordance with the present invention, the projected route segment indicator line 12 and vernier deviation indicator line 18 move away from the visibly displayed aircraft symbol 20 as the aircraft's actual position varies from the commanded course. A command heading may be indicated by a symbol 11. It is a further feature of the invention that the vernier deviation indicator segment moves from the commanded course position at an artificially magnified rate and in a direction opposite from the indicated present aircraft position to thereby provide the crew with instant and easily discernible knowledge that aircraft heading correction is required. Also in accordance with the invention, the vernier deviation indicator line may have a limit as to its movement so that for a large flight error, the deviation indicator line remains at the edge of the display. Also, in accordance with the invention, the vernier deviation line may move off of the display and then back onto the surface when the route segment line moves off of the display to indicate that the line generator is operating properly.

Figure 2:
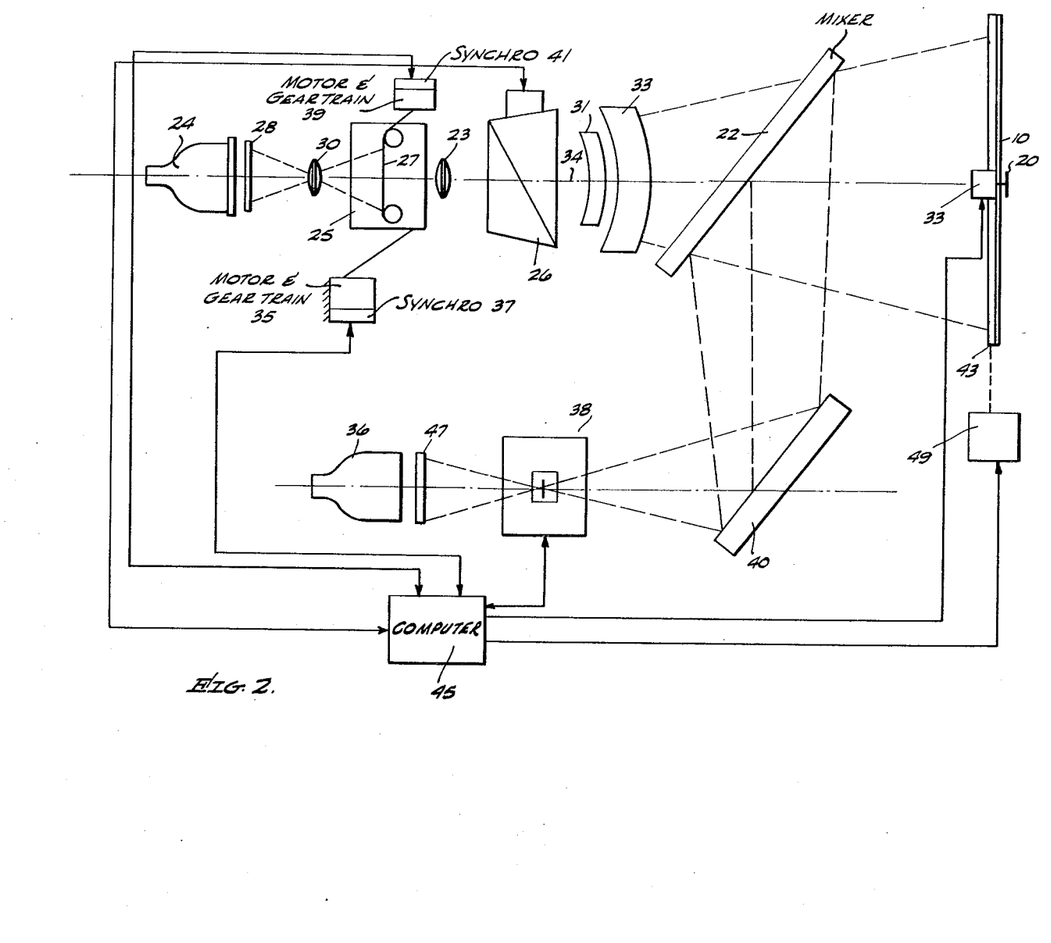
FIG. 2 is a schematic diagram of a typical optical system that may be employed with the arrangement of the invention.

Referring now to FIG. 2, the display screen 10 is shown receiving images from a mixer or light-passing mirror 22. A projection lamp 24 is appropriately arranged in determined physical relation with a map or film container 25, the latter being optically aligned on an axis 34 with a heat filter 28, focusing lenses 30 and 23, image rotating prism 26, diverging lens structure 31, and the light-passing or semi-reflective mirror or mixer 22. The mirror 22 is angularly arranged in relation to the axis 34 of the map projection optical system and accommodates passage as well as reflection of light applied thereto. For example, the mirror 22 may have a transmissivity of 50 percent and a reflectivity of 50 percent of the applied light energy. It will be understood that an appropriate map or chart is stored on a film 27 in container 25 and will thus be projected upon the display screen 10 through the structure described. Motor and gear trains 35 and 39 control the respective X and Y positions of the film 27 in response to respective synchro circuits 37 and 41.

A second optical system includes a second lamp 36 and a heat filter 47, both being optically arranged with a symbol generator structure indicated generally by a box 38. A reflecting mirror 40 is optically aligned with the mirror 22 so that route segment and vernier deviation course lines projected by lamp 36 will reflect from the mirror 40 and partially from the mirror 22 for focusing on the display screen 10. Thus, the map and course lines, after being mixed in the partially reflective mirror 22, concurrently appear on the visual display screen 10 as shown in FIG. 1. A computer 45 applies control signals to the symbol generator 38 and controls the synchro circuits 37 and 41. A motor and gear train 28 responds to the computer 45 to control the prism 26. The present position symbol 20 may be mounted on the screen 10 and controlled by a synchro circuit and a motor and gear train shown at 33 and responsive to the computer 45. For developing a command heading indication (FIG. 1), a ring 43 may be provided and controlled by a suitable synchro circuit, motor and gear train shown as unit 49 and controlled by the computer 45.

Figure 3:
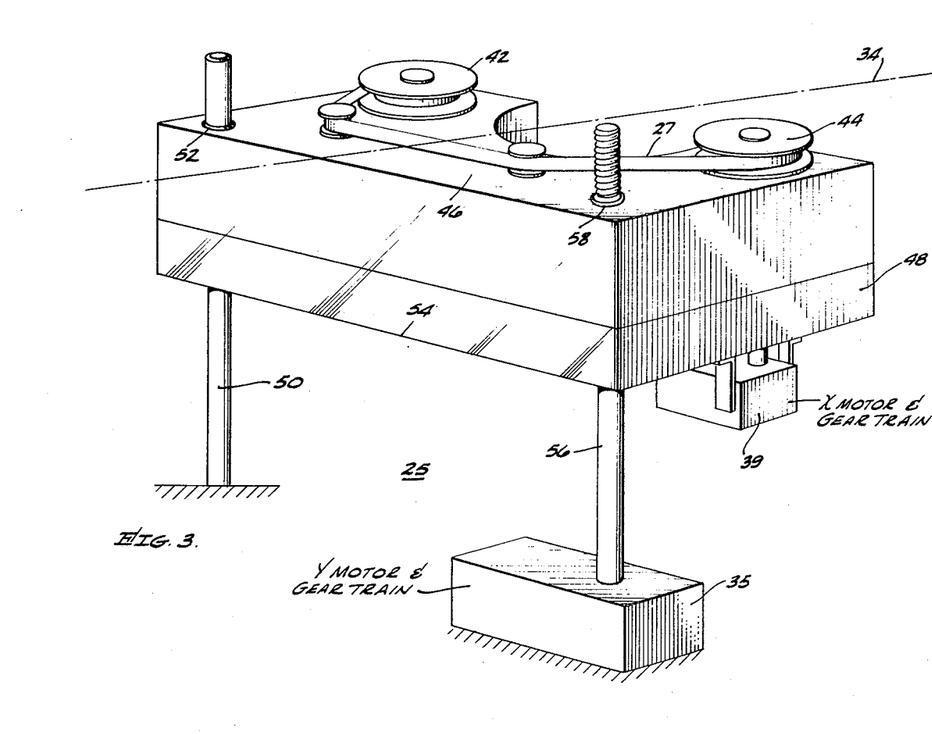
FIG. 3 is a prespective view of the film control system of FIG. 2.

Referring now also to the perspective view of FIG. 3, the film 27 is retained on spools 42 and 44 suitably mounted on a plate structure 46. A suitable gear train 48 interconnects the spools 42 and 44 so that both rotate an equal amount in either direction. The motor and gear train 39 is coupled to the gear train 48 to control the position of the film 27 in the X dimension. The motor and gear train 39 may be mounted to a structure 54 positioned below the gear train 48 and suitably attached to the plate structure 46. A fixed post 50 is provided with a ball bearing case 52 that is freely moveable therealong and mounted to the structure 46. A lead screw 56 is coupled to the motor and gear train 35 which in turn is fixedly mounted on the craft. A follower nut 58 is threaded on the lead screw 56 and mounted on the structure 46 so that rotation of the screw 56 provides movement of the film 27 in the Y direction.

Figure 4:
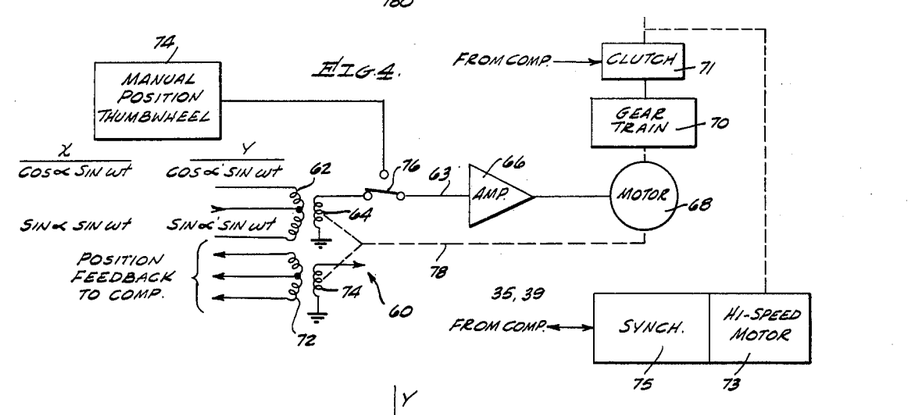
FIG. 4 is a schematic diagram of a synchro and motor control arrangement that may be utilized in the system of FIG. 2.
Figure 5:
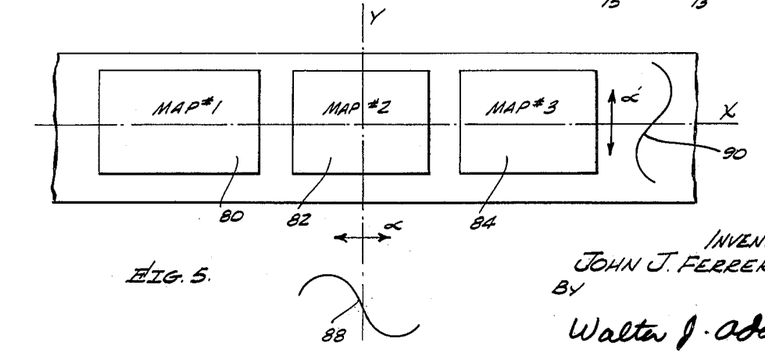
FIG. 5 is a schematic diagram of the film for explaining the automatic and the manual control of the film utilized in the projector of FIG. 2.

Referring now also to FIGS. 4 and 5, a resolver 60 includes windings 62 and 64 which apply a signal to a lead 63 and through an amplifier 66 to a motor 68. A gear train 70 responds to the motor 68 and controls, through a clutch 71, the spool 44 or the lead screw 56 depending upon whether the circuit of FIG. 4 is in the motor and gear train circuit 35 or 39. The synchro circuit 60 includes windings 72 and 74, the latter being coupled between ground and a suitable source of potential. A mechanical link 78 interconnects the motor 68 and the windings 64 and 74. For operation to control X movement for the unit 39, signals $\cos \alpha \sin \omega\tau$ and $\sin \alpha \sin \omega\tau$ are applied to the winding 62 and for operation to control the Y movement, signals $\cos \alpha' \sin \omega\tau$ and $\sin \alpha' \sin \omega\tau$ are applied to the winding 62. The radian frequency of $\omega$ is selected for reliable operation and the angles $\alpha$ and $\alpha'$ represent X and Y positions on the film frame. A manual position thumbwheel 74 and a switch 76 on the lead 63 are provided to control manual movement of the film 27. The winding 72 provides position feedback signals to the computer 45. Operation of this type of synchro circuit is well known in the art and will not be explained in further detail. For changing frames, either automatically or in response to the pilot, a high speed motor and gear train 73 and a synchro circuit 75 respond to the computer 45 which also operates the clutch 71 to disconnect the gear train 70. It is to be noted that the synchros such as 41 and 49 may be similar to that shown in FIG. 4 except only a null voltage such as from the lead 63 at the input of the amplifier 66 is fed back to the computer.

The film 27 may include first, second and third frames 80, 82 and 84 as shown in FIG. 5, each of which is selectable in response to the high speed motor 73. Upon selection of a frame, the computer input signals control the X and Y positions of the map by a combination of the two signals of waveforms 88 and 90 as determined by the respective angular values of α and α'.

Figures 6, 7:
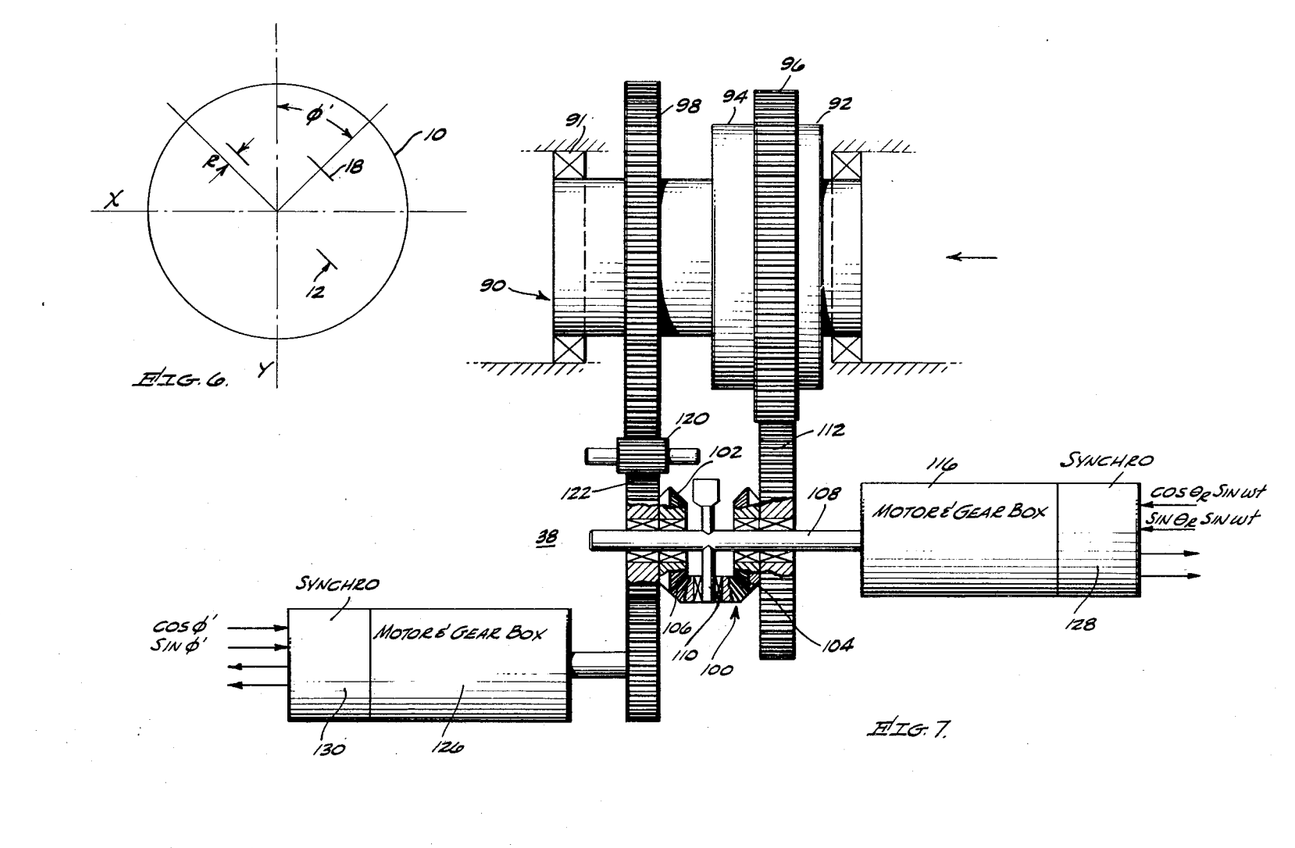
FIG. 6 is a schematic diagram of the display surface provided in the system of FIG. 2.
FIG. 7 is a schematic diagram of the symbol generator and control system in accordance with the principles of the invention.

Referring now to FIGS. 6 and 7, the screen 10 is shown with an X and a Y axis to further explain the operation of the symbol generator 38. The angle φ' is the rotational angle normal to the indication lines 12 and 18, for example, and the distance R is the distance of the line 12 from the present aircraft position which is the center of the screen in the illustrated system. In some arrangements in accordance with the invention, the distance R may be a voltage referenced to a selected level or referenced to ground at the center point and having positive and negative values so that the computer can control line movement on either side of the center point without 180 degrees rotation of the structure. It is to be noted that the line 18, which has a position relative to the center of the display that is a fixed multiple of R, does not have to be separately controlled from the computer in the illustrated system. A projector 90 includes symbol plates and lenses as will be explained subsequently, with the position of the symbol plates controlled by internal cams 92 and 94. A gear 96 is attached to the cams 92 and 94 controlling the dimension R with the angle of rotation thereof to the segmented line 12 and the distance to the line 18 which is a predetermined multiple or function of R. A gear 98 is mounted on the body of the projector 90 and the angular position thereof determines the angle φ' which is related to the direction of the commanded navigation route relative to the displayed map. A differential gear structure 100 is provided including bevel gears 102, 104 and a spider gear 106 with the gears 102 and 104 rotatably mounted with bearings on a shaft 108 and gear 106 rotatably mounted by bearings on a shaft 110 which in turn is fixedly mounted to the shaft 108. A gear 112 is provided to mesh with the gear 96 and rotates on the shaft 108 in response to a motor and gear train 116 providing rotation of the bevel gear 104. The gear 98 is controlled through a suitably mounted idler gear 120 by a gear 122 rotatably mounted on the shaft 108 by suitable bearings. A drive gear 124 responds to a motor and gear train 126 to rotate the gear 122, the gear 98 and to rotate the bevel gear 102, the gears 106, 104, 112 and 96 and to control the angle φ' as the structure 90 rotates on a fixed housing structure 91. The bevel gears 102 and 104 are fixedly mounted to respective gears 122 and 112. Rotation of the motor 126 rotates both the gears 96 and 98 at the same rate by proper selection of gear artios and idler gear 120 to control the angle φ'. Rotation of the motor 116 moves the gear 106 to rotate the gear 104 in a differential action and rotate the gear 112, which rotates gear 96 relative to gear 98. Suitable synchro circuits 128 and 130 are coupled to respective motor and gear train units 116 and 130 and are each similar to that shown in FIG. 4. The synchro circuit 128 receives signals $\cos \theta_R \sin \omega\tau$ and $\sin \theta_R \sin \omega\tau$ from the computer 45 (FIG. 2) and supplies position feedback signals thereto. The value $\theta_R$ is an angle proportional to the distance R. The synchro circuit 130 receives $\cos \phi'$ and $\sin \phi'$ signals from the computer 45 and supplies position feedback signals thereto.

Figure 8:
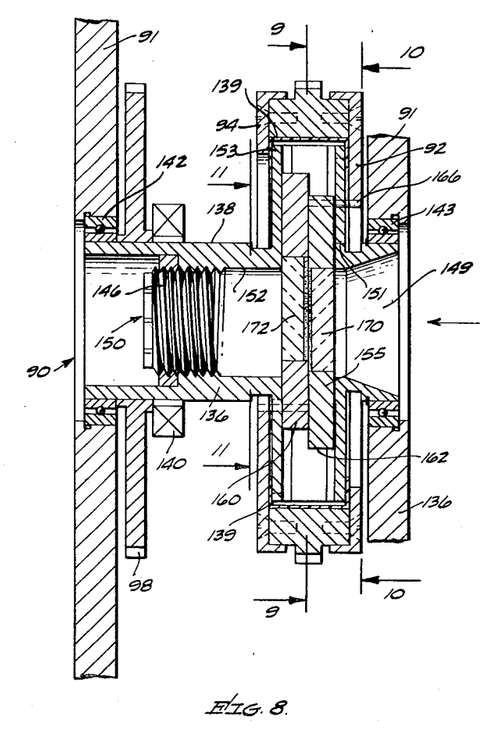
FIG. 8 is a broken away side view of the optical system of FIG. 7 in accordance with the invention for forming the route segment and course deviation symbols.

Referring now to FIG. 8, the display control projector 90 includes the housing 91 having a display mechanism as indicated generally at 138 rotatably mounted thereto by suitable bearing structures 142 and 143. Thus, the entire mechanism is free to rotate within the housing 91 in response to movement of the gear 98 which is fixedly mounted to an extending structure 136 of the mechanism 138 by an appropriate clamp 140. The gear 96, which is rotatably mounted to the structure 138, also moves with the gear 98 so that the R dimension does not vary with angular movement. Mounted within the cylindrical structure 136 is a lens 146 which in response to the lamp 36 (FIG. 2), results in a light beam being projected through the cavities 149, 152 and 150 of the structure 138. A peripheral flange 151 is provided extending radially outward from the structure 138 and fixedly mounted to a circular flange structure 153 of the structure 138. The flange 153 is generally circular in form and is provided with an elongated cavity or slot 155 which provides a slide area for a pair of reticle holders 160 and 162. The reticle holders 160 and 162 are free to move in the elongated cavity 155 and are parallel to the axis thereof. Projecting pins 164 and 166 are provided at the ends of respective reticle holders 160 and 162 and ride on the inner surface of respective internal cams 94 and 92. A coiled spring 171 (FIG. 9) interconnects the pins 176 and 178 to bias the reticle holder 160 upward and the reticle holder 162 downward in the side view of FIG. 8. The cams 94 and 92 and the gear 96 are bolted together to form a unit rotatable on a bearing surface 139 provided on the periphery of the flange 153 and the flange 151. Cams 94 and 92 may be adjusted in relative angular position to each other and/or the gear 96 for purposes of alignment. The bearing 139 may be formed of a suitable dry lubrication or a teflon material as is well known in the art.

Figure 9:
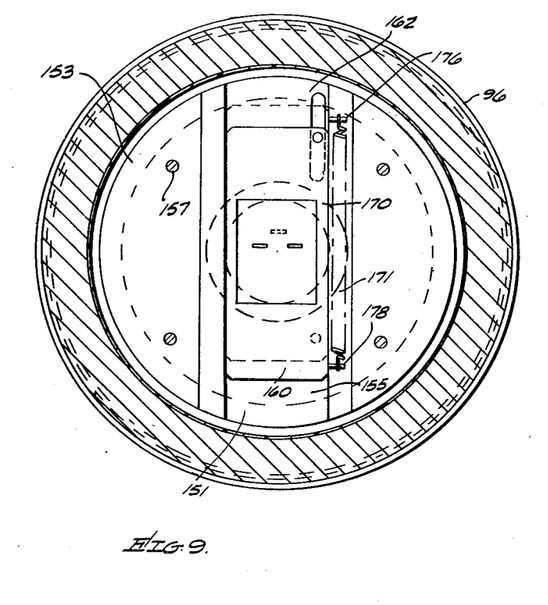
FIG. 9 is a sectional view of the symbol generator taken along line 9—9 of FIG. 8.
Figure 12:
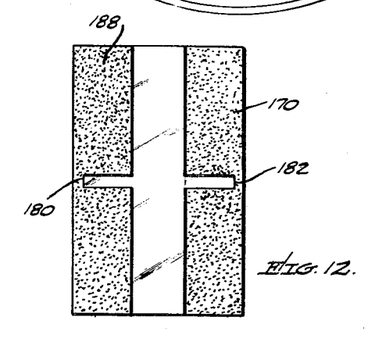
FIG. 12 is a detail plan view of one reticle element employed in the system of FIG. 8 for forming the route segment indicator line.
Figure 13:
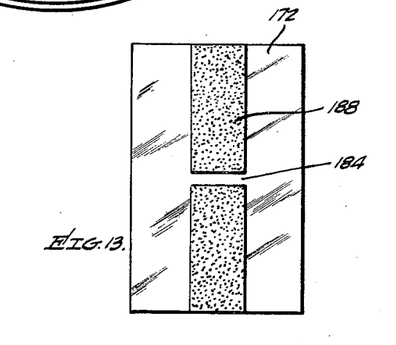
FIG. 13 is a detail plan view of a second reticle element employed in the system of FIG. 8 for forming the vernier deviation indicator line.

As shown in FIG. 9, the spring 171 is coupled to pins 176 and 178 in turn mounted on respective plates 162 and 160. The slot 155 of the flange 153 contains the reticle holders 162 and 160, each of which may include a respective reticle plate 170 and 172. Referring temporarily to FIGS. 12 and 13, the reticle plate 170 includes lines 180 and 182 and the reticle plate 172 includes a line 184. The plates 170 and 172 may be formed of a normally transparent material such as a plastic or glass, having a portion of the surface aluminized as at 188 to render it opaque. The clear areas of lines 180, 182 and 184 pass light therethrough to define the route segment and vernier deviation lines. The plates 170 and 172 when in surface abutting juxtaposition, may be moved so that the slot 184 is longitudinally aligned between the transparent slots or lines 180 and 182. The plate 170 has an elongated vertical clear area and the plate 172 has an elongated vertical opaque area with the line area 184 therein and with a slightly greater width than that of the clear area of the plate 170. Thus, as the reticle holders 160 and 162 move longitudinally in the cavity 152 to a central point, the slot 184 may be continguously aligned with the slots 180 and 182 to present in the plane of projection, a continuous line accommodating the passage of light therethrough. The light passing through the slots 180 and 182 when projected to the viewing screen 10 (FIG. 2) will define the route segment lines 14 and 16 (FIG. 1), and the slot 184 when projected as shown in FIG. 2, will define on the screen 10 the vernier deviation line 18. The flange 151 is mounted to the flange structure 153 by suitable bolts indicated at 157 of FIG. 9 so that the reticle holders 160 and 162 are retained in the cavity 155.

Figure 10:
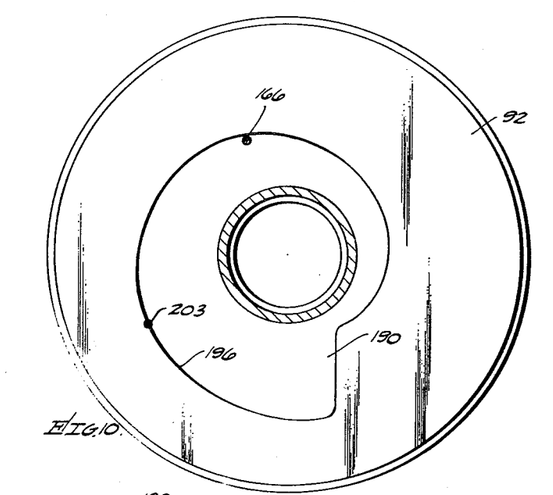
FIG. 10 is a sectional view of the symbol generator taken along line 10—10 of FIG. 8 and showing the route segment indicator cam.
Figure 11:
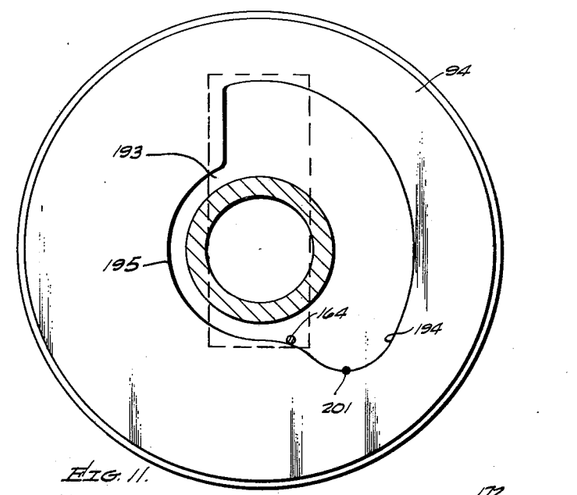
FIG. 11 is a sectional view of the symbol generator taken along line 11—11 of FIG. 8 and showing the vernier deviation indicator cam.

Referring now principally to FIGS. 10 and 11, the cams 92 and 94 are formed of plates which define respective cam openings 190 and 193. The vernier deviation cam 94 has an internal surface 194 and the route segment cam 92 has an internal surface 196 on which respective pins 164 and 166 ride. Each surface 194 and 196 controls movement of the lines on either side of the center or crossover point so that rapid 180 degree rotation of the structure is not required. The slope of the surface 194 is selected multiple or function of the slope of the surface 196, such as five times the slope. Also in accordance with the invention, the slope of the surface 194 may be an exponential or any varying function of the slope of the surface 196 so that a small deviation of flight path is shown magnified at a greater proportional rate than a large deviation of flight path. A limit surface 195 and 199 of the cam 94 is provided so that no pin movement is provided along the slot and the vernier deviation indicator line will remain at the edge of the screen 10 for large flight position errors. During this condition only the route segment indicator will move outward in response to additional flight position error. Points 201 and 203 are the center or crossover position of the surfaces 194 and 196. Limit surfaces are also provided for the cam 92 to limit the maximum movement of the route segment indicator line to the edge of the display surface. In the illustrated arrangement, the variation in rise and fall of the cam surfaces is such that the reticle holder 160 though moving in the same direction as the reticle holder 162, will consistently move at a rate that is five times greater than that of the reticle holder 162 (except at the limit). It will thus be apparent that any movement of the projected route segment segments 14 and 16 and vernier deviation indicator segment 18 on the screen 10 will be in identical direction from the center of the display, but the vernier segment 18 will have a movement that is clearly magnified. Thus, as shown in FIG. 2, the map is projected on the screen 10 at a changing position relative to the aircraft position indication 20 at the center of the screen so that the present position is presented on the display. The route segment indication lines are controlled to indicate the actual commanded or desired route relative to the projected map with the vernier deviation indicator line 18 magnifying any error in aircraft deviation from the commanded route.

The symbol forming system of the invention may utilize cam surfaces so that the route segment line moves off of the display surface 10 in response to a large error and the vernier deviation indicator line then moves onto and remains on the display surface to show that a large error is present and that the system is operating. The distance of the cam surface from the rotational axis varies with the angular position of the cams relative to the body enclosing the reticle holders to provide any desired functional relationship in accordance with the invention. Also in accordance with the invention, the route segment line and the vernier lines may be of desired colors by any suitable arrangement such as having two colors on one plate with the other being clear, having only the slots colored, or having a combination of two colors that in certain positions will mix or cancel to form a third color.

Thus, there has been described a symbol forming system for providing a route segment line indication formed of two line segments having a space therebetween and a vernier deviation indicator line formed of a single line movable into the gap and laterally therefrom. The mechanism allows a high intensity light suorce to be utilized so as to provide a high degree of screen brightness, if desired. For a display in which a reference point is provided, the indicator lines may be positioned on either side of the reference point and at any angular position around the point. It is to be noted that the principles of the invention are applicable to a display in which a variable reference point is utilized by providing an R and $\phi'$ motion for the lens 146 of FIG. 8. The vernier deviation line may be controlled to move as any selected function of the route segment line. The structure of the invention utilizes cam surfaces so that the indicator lines may be limited such as at the edge of the display surface. For reliable control, the symbol projector of the invention includes a differential gear structure controlled by suitable servo motors. Also within the principles of the invention, another differential gear structure may be included in the system so that the two cams may be separately controlled. Although the symbol generator of the invention has been described reltaive to forming navigation aircraft symbols, it is to be understood that the principles of the invention are equally applicable to any type of navigation display such as for ships or submarines or to any type of display not related to navigation and on which are utilized the type of symbols described herein.

What is claimed is:

1. A symbol forming device comprising
    optical means having an object plane,
    a flange structure having an elongated slot therein,
    first and second reticle structures positioned in said slot and movable therealong, said reticle structures being located in said object plane,
    first and second cams having surfaces respectively contacting said first and second reticle structures and being jointly movable, the surfaces of said cams having a predetermined functional relationship,
    and control means coupled to said cam structure and to said first and second cams for selectively moving said first and second cams relative to said flange structure or moving said flange structure and said first and second cams.

2. The combination of claim 1 in which said flange structure and said cams are rotatable about a projection axis and in which said control means provides rotation of said first and second cams relative to said flange structure or rotation of said flange structure and said first and second cams.

3. The combination of claim 2 in which said control means is a differential gear structure.

4. A symbol forming device for projecting symbols relative to an axis comprising
    a circular structure positioned on the axis and having a flange with an elongated slot therein orthogonal to said axis,
    first and second reticle holders positioned in said slot and movable therealong,
    first and second reticle plates respectively mounted in said first and second reticle holders for respectively forming first and second elongated symbols,
    first and second cams respectively having first and second surfaces contacting said first and second reticle holders for moving said holders along said elongated slot, said first and second surfaces having selected functional relationships to move said first and second symbols with a selected positional relationship relative to said axis,
    and image projection means positioned along said axis for developing an image from said reticle plates.

5. The combination of claim 4 in which said first and second cams jointly rotate on said axis and said first and second surfaces have curves relative to said axis so that the rate of movement of said second symbol is a predetermined multiple of the rate of movement of said first symbol.

6. The combination of claim 5 further including a display surface positioned so that said axis passes through the center thereof and in which the curves of said first and second cam surfaces are selected so that said first and second symbols move outward from the center of said display surface in first and second directions 180 degrees apart.

7. The combination of claim 6 further including a rotatable structure retaining said circular structure, and a differential drive structure coupled to said rotatable structure and to said first and second cams for selectively rotating said rotatable structure including said first and second cams or rotating said first and second cams relative to said rotatable structure.

8. A symbol projection device comprising
    a mounting structure,
    a rotating structure including a flange and mounted to said mounting structure for rotating around an axis, said flange including an elongated slot,
    first and second reticle holders positioned in said elongated slot and movable therealong, each reticle holder having a pin mounted therein,
    first and second reticle plates respectively positioned in said first and second reticle holders and respectively providing a route segment indicator line having a gap in the center thereof and a deviation indicator line having a length substantially equal to said gap,
    first and second cams rotatably mounted relative to said rotating structure and respectively having first and second internal surfaces respectively contacting said first and second pins, said surfaces having a selected functional relationship relative to said axis, first and second gears respectively mounted to said rotating structure and jointly to said first and second cams, means for selectively rotating said first and second gears, light projection means positioned substantially along said axis on a first side of said reticle plates, and optical means positioned substantially along said axis on a second side of said reticle plates.

9. The combination of claim 8 in which the functional relationship of the surfaces of said first and second cams is selected so that said route segment and deviation indicator lines are jontly movable on either side of the axis radially therefrom and the rate of movement of the deviation line from the axis is substantially greater than the rate of movement of the route segment line.

10. The combination of claim 9 in which said means for rotating includes a differential gear structure meshed with said first and second gears for selectively providing rotation of said first and second gears to rotate said rotating structure relative to said mounting structure and rotate said route segment and deviation lines around said axis or providing rotation of only said second gear to move said route segment and deviation lines radially relative to said axis.

11. The combination of claim 10 in which said differential gear structure is driven by first and second motor means to control the projection position of said route segment line and deviation line.

References Cited

FOREIGN PATENTS 676,458   7/1952   Great Britain.

NORTON ANSHER, Primary Examiner

R. P. GREINER, Assistant Examiner

U.S. Cl. X.R.

73—178; 116—114; 340—27; 353—30